(12) United States Patent
Liu et al.

(10) Patent No.: US 8,984,203 B2
(45) Date of Patent: Mar. 17, 2015

(54) MEMORY ACCESS CONTROL MODULE AND ASSOCIATED METHODS

(71) Applicants: Baojing Liu, San Jose, CA (US); Matt Davidson, Mountain View, CA (US); Aruna Gutta, Saratoga, CA (US)

(72) Inventors: Baojing Liu, San Jose, CA (US); Matt Davidson, Mountain View, CA (US); Aruna Gutta, Saratoga, CA (US)

(73) Assignee: SanDisk Technologies Inc., Plano, TX (US)

( * ) Notice: Subject to any disclaimer, the term of this patent is extended or adjusted under 35 U.S.C. 154(b) by 226 days.

(21) Appl. No.: 13/647,971

(22) Filed: Oct. 9, 2012

(65) Prior Publication Data

US 2014/0101354 A1 Apr. 10, 2014

(51) Int. Cl.
*G06F 13/38* (2006.01)
*G06F 13/16* (2006.01)
*G06F 13/40* (2006.01)

(52) U.S. Cl.
CPC ........ *G06F 13/1678* (2013.01); *G06F 13/4018* (2013.01)
USPC ................ 710/307; 710/33; 710/66; 711/171

(58) Field of Classification Search
CPC ............ G06F 13/4018; G06F 13/4059; G06F 13/1678; G06F 13/1673; G06F 13/1684
USPC ................. 710/33, 35, 52, 66, 315, 310, 307; 711/147, 171
See application file for complete search history.

(56) References Cited

U.S. PATENT DOCUMENTS

| 2004/0019748 | A1 | 1/2004 | Lee |
| 2005/0144369 | A1* | 6/2005 | Jaspers .................... 711/105 |
| 2010/0036999 | A1 | 2/2010 | Zhuang et al. |
| 2010/0325368 | A1* | 12/2010 | O'Brien et al. ............. 711/147 |

FOREIGN PATENT DOCUMENTS

EP 2 264609 A1 12/2010

OTHER PUBLICATIONS

PCT/US2013/063944, International Search Report and Written Opinion of the International Searching Authority (EP), Mailed Feb. 10, 2014.

* cited by examiner

*Primary Examiner* — Glenn A Auve
(74) *Attorney, Agent, or Firm* — Martine Penilla Group, LLP

(57) ABSTRACT

First and second data interfaces provide data transfer to and from a plurality of memory banks. The first data interface uses a first bus size and a first clock frequency. The second data interface uses a second bus size and a second clock frequency. The second bus size is an integer multiple of the first bus size. The first clock frequency is an integer multiple of the second clock frequency. A channelizer module segments data from the second data interface into data segments of the first bus size and transmits them to addressed ones of the plurality of memory banks using the first clock frequency. The channelizer module also receives data in accordance with the first bus size and first clock frequency from the plurality of memory banks, combines this data into the second bus size, and transmits the data to the second data interface using the second clock frequency.

20 Claims, 5 Drawing Sheets

MEMORY ACCESS CONTROL MODULE AND ASSOCIATED METHODS

BACKGROUND

Many computing systems can include components and/or sub-systems that operate on different clock frequencies and that have different data bus bit sizes. For example, a computing system may include a processor that operates at a higher clock frequency than a system bus master. And, the same computing system may have a system bus that has a larger bit size than its processor bus. In this example computing system, both the processor and the components connected to the system bus will need access to some amount of computer memory. Because or the differences in clock frequency and bus size, the processor and system bus master may need different computer memories operating in accordance with their respective clock frequency and bus size. However, use of multiple memory devices operating in accordance with different clock frequencies and bus sizes adds expense and complexity to the computing system. Therefore, it is of interest that both the processor and the system bus master be able to utilize a common shared memory device, despite their differences in clock frequency and bus size. It is within this context that the present invention arises.

SUMMARY

In one embodiment, a memory access control module is disclosed. The memory access control module includes a first data interface for data transfer to and from a first data communication bus in accordance with a first data bus bit size and a first clock frequency. The memory access control module also includes a plurality of arbitration modules connected for data communication with the first data interface in accordance with the first data bus bit size and the first clock frequency. The memory access control module also includes a plurality of memory banks connected for data communication with the plurality of arbitration modules in accordance with the first data bus bit size and the first clock frequency, such that each of the plurality of memory banks is connected for data communication with a different one of the plurality of arbitration modules. The memory access control module also includes a second data interface for data transfer to and from a second data communication bus in accordance with a second data bus bit size and a second clock frequency. The second data bus bit size is an integer multiple of the first data bus bit size. The first clock frequency is an integer multiple of the second clock frequency. The memory access control module also includes a channelizer module connected for data communication with the second data interface in accordance with the second data bus bit size and the second clock frequency. The channelizer module is further connected for data communication with the plurality of arbitration modules in accordance with the first data bus bit size and first clock frequency. The channelizer module is defined to segment data received from the second data interface during a store operation from the second data bus bit size into a number of data segments of the first data bus bit size. The channelizer module is also defined to transmit the data segments of the first data bus bit size along respective data channels to addressed ones of the plurality of memory banks by way of corresponding ones of the plurality of arbitration modules in accordance with the first clock frequency during the store operation. The channelizer module is also defined to receive data in accordance with the first data bus bit size and first clock frequency from addressed ones of the plurality of memory banks by way of corresponding ones of the plurality of arbitration modules during a load operation. The channelizer module is also defined to combine data received from the plurality of memory banks during the load operation into the second data bus bit size and transmit the combined data of the second data bus bit size to the second data interface in accordance with the second clock frequency.

In another embodiment, a method is disclosed for controlling access to a memory. The method includes receiving a first memory access request from a first data interface in accordance with a first data bus bit size and a first clock frequency. The method also includes transmitting the first memory access request to an arbitration module responsible for a memory bank addressed by the first memory access request in accordance with the first data bus bit size and the first clock frequency. The method also includes receiving a second memory access request from a second data interface in accordance with a second data bus bit size and a second clock frequency. The second memory access request is a data store request. The second data bus bit size is an integer multiple of the first data bus bit size. The first clock frequency is an integer multiple of the second clock frequency. The method also includes segmenting the second memory access request of the second data bus bit size into data segments of the first data bus bit size. The method also includes transmitting each data segment of the first data bus bit size to an arbitration module responsible for a memory bank addressed by the data segment of the first data bus bit size in accordance with the first clock frequency.

Other aspects and advantages of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
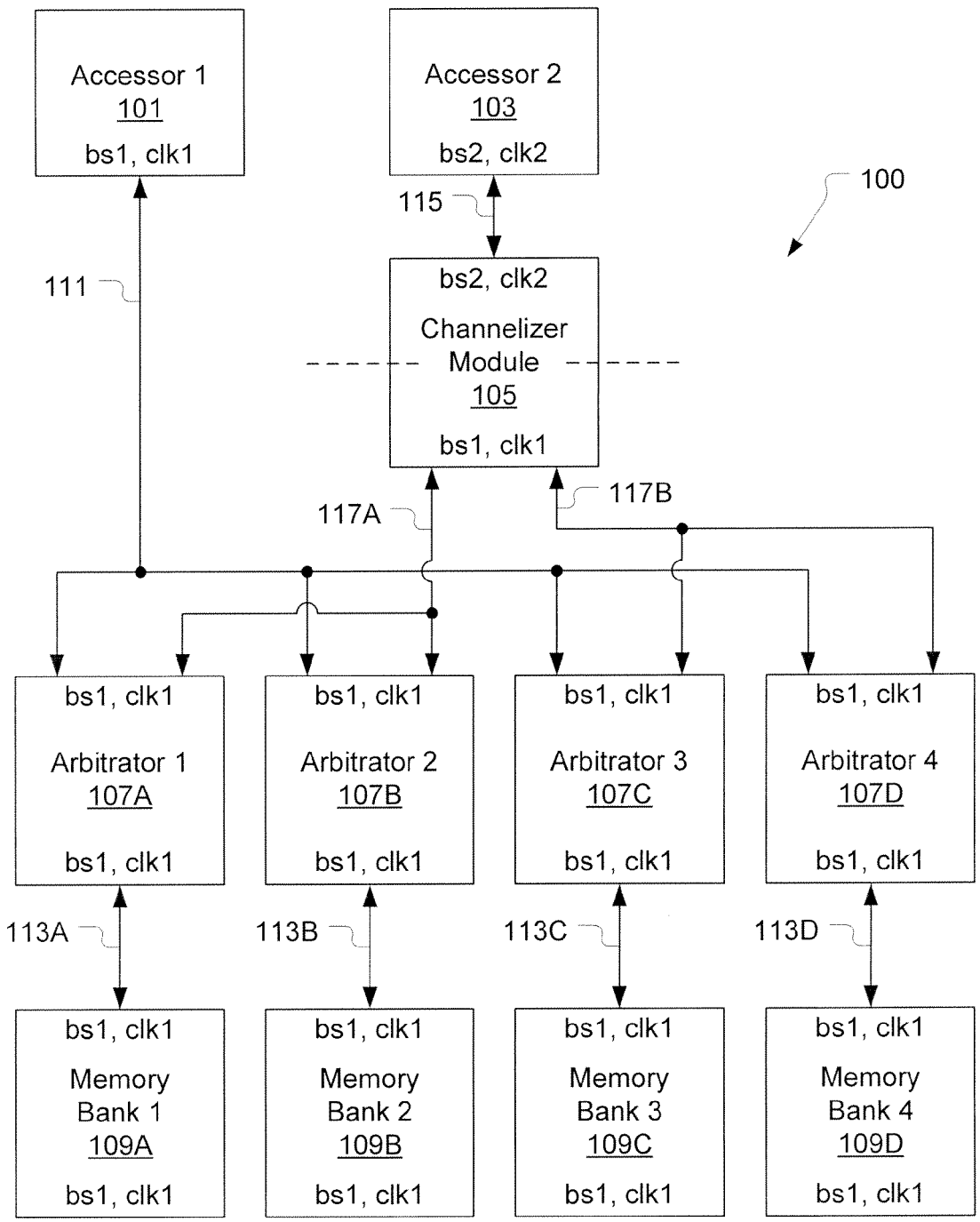
FIG. 1 shows a computing system, in accordance with one embodiment of the present invention.

FIG. 1 shows a computing system 100, in accordance with one embodiment of the present invention. The computing system 100 includes a plurality of memory banks 109A-109D and a plurality of memory accessors 101, 103. The memory accessors 101, 103 can be any type of computing component, such as, without limitation, a computer processor, system bus master, or another computing component that requires access to a computer memory. In one embodiment, the first memory accessor 101 is defined as a computer processor, and the second memory accessor 103 is defined as a system bus master 103 through which other computing components can access the plurality of memory banks 109A-109D. While FIG. 1 shows four memory banks 109A-109D by way of example, it should be understood that other embodiments can implement essentially any number of memory banks. In one embodiment, each of the memory banks 109A-109D is defined as a static random access memory (SRAM). However, it should be understood that in other embodiments the memory banks 109A-109D can be defined as any type of computer memory, or any combination of computer memory types. Also, with the multiple memory banks 109A-109D, each memory bank 109A-109D is configured to include a different portion of an overall addressable memory space.

Access to each of the plurality of memory banks 109A-109D is controlled by a respective one of a plurality of arbitration modules 107A-107D. As shown in FIG. 1, each arbitration module 107A-107D is in bidirectional data communication with a respective one of the memory banks 109A-109D, as indicated by arrows 113A-113D. During a data store operation, i.e., data write operation, the arbitration module 107A-107D will communicate the data store instruction and the data to be stored to its memory bank 109A-109D. During a data load operation, i.e., data read operation, the arbitration module 107A-107D will communicate the data load instruction to its memory bank 109A-109D and receive the data requested.

Each arbitration module 107A-107D is defined to control access to its memory bank 109A-109D, respectively, such that a number of access requests to its memory bank at a given time is maintained within allowable specifications for the particular memory bank. For example, if the memory bank 109A-109D is defined to process one access request at a time, the arbitration module 107A-107D for the memory bank 109A-109D will operate to ensure that the memory bank 109A-109D is only tasked with one access request at a time. Any additional access requests that arrive at the arbitration module 107A-107D while the memory bank 109A-109D is busy will be held by the arbitration module 107A-107D until the memory bank 109A-109D is available to process the next memory access request.

The first memory accessor 101 is connected to communicate with each of the arbitration modules 107A-107D, as indicated by arrows 111. Arrows 111 correspond to a first data communication bus 111. In this manner, the first memory accessor 101 is capable of transmitting a memory access request to a particular arbitration module 107A-107D responsible for a memory bank 109A-109D that includes a targeted memory address. In the example embodiment of FIG. 1, the first memory accessor 101, each of the arbitration modules 107A-107D, and each of the memory banks 109A-109D are defined to communicate data to each other in accordance with a first clock having a first clock frequency clk1 and in accordance with a first data bus bit size bs1.

The second memory accessor 103 is defined to operate in accordance with a second clock having a second clock frequency clk2 and in accordance with a second data bus bit size bs2. Therefore, the second memory accessor 103 has data interface specifications, in terms of clock frequency and data bus bit size, that are different from the plurality of arbitration modules 107A-107D. As a result, the second memory accessor 103 is not able to directly communicate with the arbitration modules 107A-107D. To accommodate this situation, a channelizer module 105 is connected between the second memory accessor 103 and the plurality of arbitration modules 107A-107D.

In particular, the second memory accessor 103 transmits data to and receives data from the channelizer module 105 in accordance with the second clock frequency clk2 and second data bus bit size bs2, as indicated by arrow 115. Arrow 115 refers to a second data communication bus 115. And, the channelizer module 105 transmits data to and receives data from the plurality of arbitration modules 107A-107D, as indicated by arrows 117A and 117B, in accordance with the first clock frequency clk1 and first data bus bit size bs1. Specifically, the channelizer module 105 is connected to communicate with the plurality of arbitration modules 107A-107D through two separate data communication channels represented by arrows 117A and 117B, respectively. In this manner, the channelizer module 105 can transmit data to and receive data from arbitration modules 107A and 107B using the first data communication channel, as indicated by arrow 117A. And, the channelizer module 105 can transmit data to and receive data from arbitration modules 107C and 107D using the second data communication channel, as indicated by arrow 117B.

The channelizer module 105 is defined to communicate data through each of the data communication channels 117A, 117B in accordance with the first clock frequency clk1 and the first data bus bit size bs1, so as to be compatible with the data interface of the arbitration modules 107A-107D. It should be understood that the channelizer module 105 is defined to transmit data through and receive data from each of the two communication channels 117A, 117B in an independent manner. Therefore, in a given cycle of the first clock, i.e., in accordance with a given cycle of the first clock frequency clk1, data can be transmitted independently through each of the communication channels 117A, 117B. Thus, each communication channel 117A, 117B is connected to communicate data with a different portion of the memory banks 109A-109D, by way of the arbitration modules 107A-107D.

Figure 2:
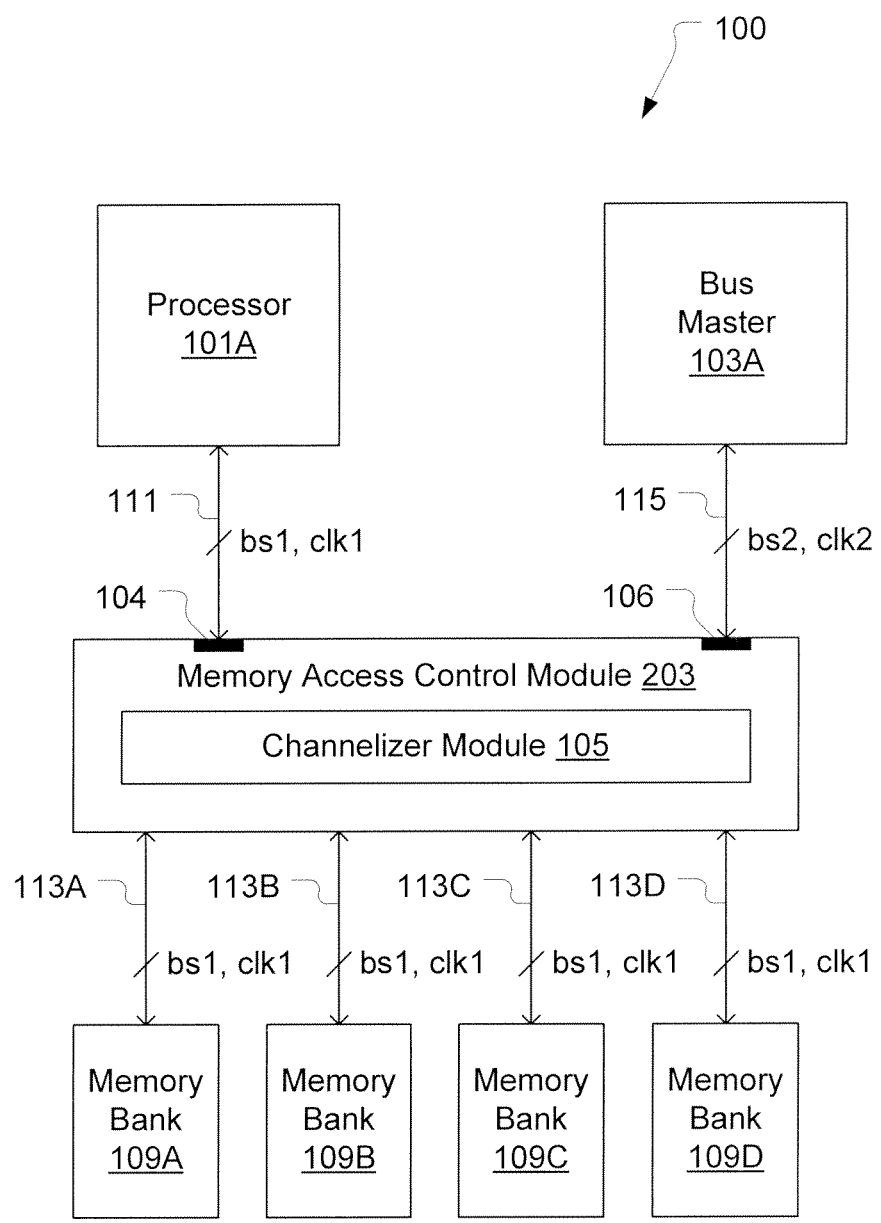
FIG. 2 shows the computing system in which a memory access control module is implemented to control access to the plurality of memory banks by a computer processor as the first memory accessor and by a system bus master as the second memory accessor, in accordance with one embodiment of the present invention.

FIG. 2 shows the computing system 100 in which a memory access control module 203 is implemented to control access to the plurality of memory banks 109A-109D by a computer processor 101A as the first memory accessor 101 and by a system bus master 103A as the second memory accessor 103, in accordance with one embodiment of the present invention. The memory access control module 203 can also be referred to as a direct memory access bridge 203. The memory access control module 203 includes a first data interface 104 for data transfer to and from the first data communication bus 111 in accordance with the first data bus bit size bs1 and the first clock frequency clk1. The memory access control module 203 also includes a second data interface 106 for data transfer to and from the second data communication bus 115 in accordance with the second data bus bit size bs2 and the second clock frequency clk2.

In one embodiment, the second data bus bit size bs2 is an integer multiple of the first data bus bit size bs1. In one embodiment, the second data bus bit size bs2 is two times the first data bus bit size bs1. For instance, in one embodiment, the first data bus bit size bs1 is 32 bits, and the second data bus bit size bs2 is 64 bits. Also, in one embodiment, the first clock frequency clk1 is an integer multiple of the second clock frequency clk2. For example, in one embodiment, the first clock frequency clk1 is two times the second clock frequency clk2. Therefore, by way of example, in this embodiment, if the first clock frequency clk1 is 400 MHz, the second clock frequency clk2 is 200 MHz It should be understood that these clock frequencies are used to demonstrate the integer multiple relationship between the first clock frequency clk1 and second clock frequency clk2, and in no way represent any limitation on the clock frequencies that can be utilized with the memory access control module 203 disclosed herein.

The memory access control module 203 also includes the plurality of arbitration modules 107A-107D connected for data communication with the first data interface 104, in accordance with the first data bus bit size bs1 and the first clock frequency clk1. As discussed with regard to FIG. 1, the plurality of memory banks 109A-109D are connected for data communication with the plurality of arbitration modules 107A-107D, in accordance with the first data bus bit size bs1 and the first clock frequency clk1, such that each of the plurality of memory banks 109A-109D is connected for data communication with a different one of the plurality of arbitration modules 107A-107D.

The memory access control module 203 includes the channelizer module 105 as previously discussed with regard to FIG. 1. The channelizer module 105 is connected for data communication with the second data interface 106, in accordance with the second data bus bit size bs2 and the second clock frequency clk2. The channelizer module 105 is further connected for data communication with the plurality of arbitration modules 107A-107D, in accordance with the first data bus bit size bs1 and first clock frequency clk1.

The channelizer module 105 is defined to segment data received from the second data interface 106 from the second data bus bit size bs2 into a number of data segments of the first data bus bit size bs1 during a store operation. The channelizer module 105 is also defined to transmit the data segments of the first data bus bit size bs1 along respective data channels 117A, 117B to addressed ones of the plurality of memory banks 109A-109D, by way of corresponding ones of the plurality of arbitration modules 107A-107D, in accordance with the first clock frequency clk1 during the store operation.

The channelizer module 105 is also defined to receive data in accordance with the first data bus bit size bs1 and first clock frequency clk1 from addressed ones of the plurality of memory banks 109A-109D, by way of corresponding ones of the plurality of arbitration modules 107A-107D, during a load operation. The channelizer module 105 is further defined to combine data received from the plurality of memory banks 109A-109D during the load operation into the second data bus bit size bs2 and transmit the combined data of the second data bus bit size bs2 to the second data interface 106 in accordance with the second clock frequency clk2.

Figure 3:
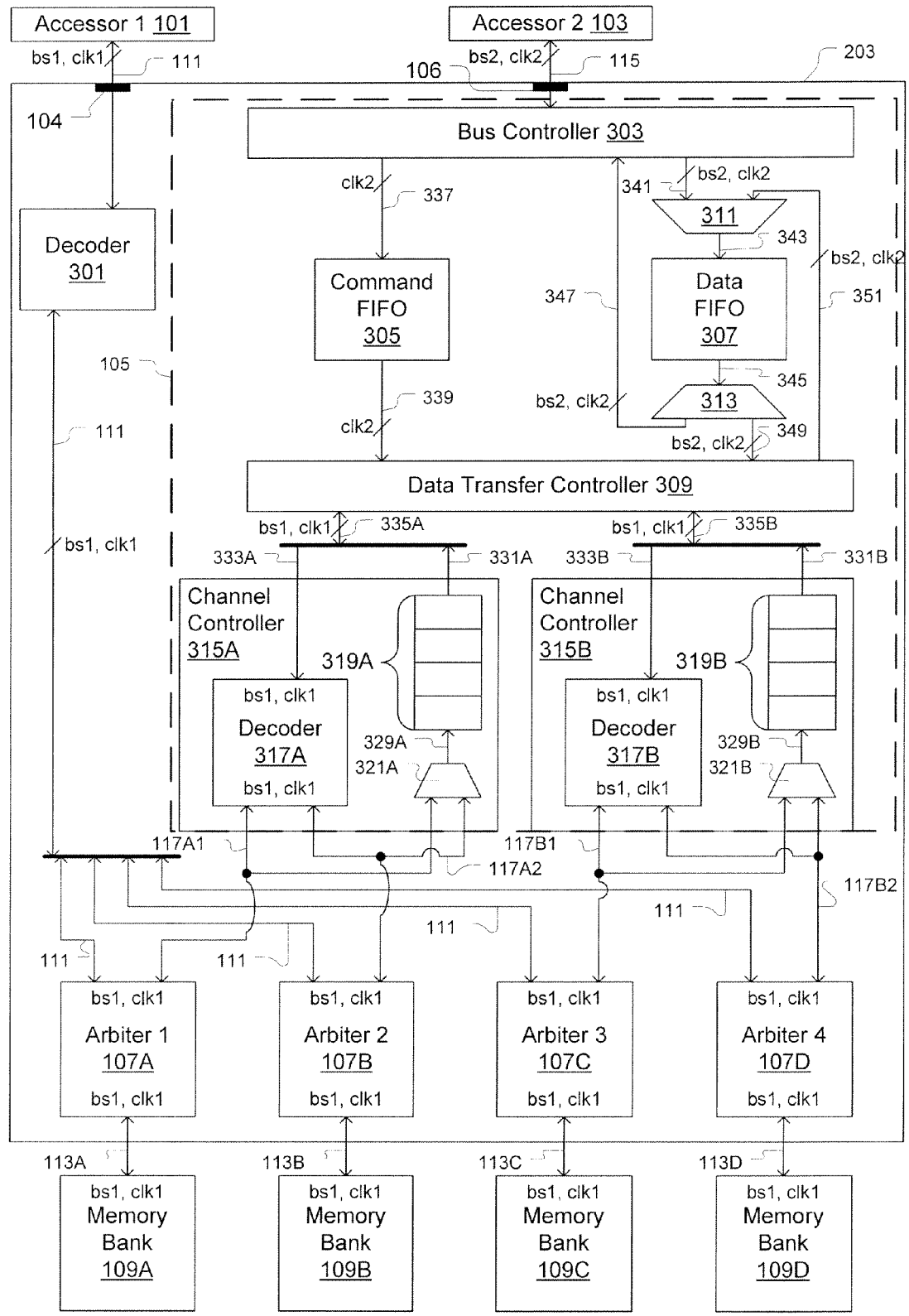
FIG. 3 shows the computing system of FIGS. 1 and 2 with a more detailed view of the memory access control module, in accordance with one embodiment of the present invention.

FIG. 3 shows the computing system 100 of FIGS. 1 and 2 with a more detailed view of the memory access control module 203, in accordance with one embodiment of the present invention. Data communication through the first data interface 104 is received at a decoder 301. The decoder 301 is defined to process the data communication received from the first memory accessor 101 to determine the targeted memory address of the data communication. The decoder 301 is further defined to direct the data communication received from the first memory accessor 101 to the memory bank 109A-109D that includes the targeted memory address by way of its arbitration module 107A-107D. In this manner, the decoder 301 is connected between the first data interface 104 and the plurality of arbitration modules 107A-107D. The decoder 301 is defined to determine a memory address to which a memory access request from the first memory accessor 101 is directed. The decoder 301 is defined to direct the memory access request from the first memory accessor 101 to one of the plurality of arbitration modules 107A-107D connected to one of the plurality of memory banks 109A-109D that includes the determined memory address. It should be understood that data communication between the first memory accessor 101 and the plurality of memory banks 109A-109D, by way of the decoder 301 and plurality of arbitration modules 107A-107D, is conducted in accordance with the first data bus bit size bs1 and in accordance with the first clock frequency clk1.

FIG. 3 also shows the data communication from the second memory accessor 103 received through the second data interface 106, by way of the second data communication bus 115, and is transmitted to the channelizer module 105. It should be understood that the channelizer module 105 is defined to receive data from and transmit data to the second data interface 106 in accordance with the second data bus bit size bs2 and in accordance with the second clock frequency clk2. In the channelizer module 105, the data communication is received by a bus controller 303. The bus controller 303 is defined to parse the incoming data communication to extract memory access commands and data. The bus controller 303 is defined to transmit the extracted memory access commands to a command FIFO (first-in-first-out buffer) 305, in accordance with the second clock frequency clk2, as indicated by arrow 337. The extracted memory access commands are then transmitted from the command FIFO 305 to a data transfer controller 309, in accordance with the second clock frequency clk2, as indicated by arrow 339.

Also, the bus controller 303 is defined to transmit the data from the incoming data communication to a first load/store MUX (multiplexer) 311, in accordance with the second data bus bit size bs2 and in accordance with the second clock frequency clk2, as indicated by arrow 341. During a data store operation, the data from the incoming data communication is transmitted from the first load/store MUX 311 to a data FIFO 307, as indicated by arrow 343. Also, data from the data FIFO 307 is transmitted to a second load/store DEMUX 313, as indicated by arrow 345. During a data store operation, data is transmitted from the data FIFO 307, by way of the second load/store DEMUX 313, to the data transfer controller 309, in accordance with the second data bus size bs2 and in accordance with the second clock frequency clk2, as indicated by arrow 349.

The data transfer controller 309 is defined to parse the memory access commands received from the command FIFO 305, and align the memory access commands with the corresponding data received from the data FIFO 307. During a store operation, the data transfer controller 309 channelizes the incoming data into a number of data segments of the first data bus bit size bs1. The number of data segments of the first data bus bit size bs1 is equal to the integer multiple by which the second data bus bit size bs2 is larger than the first data bus bit size bs1. For example, if the second data bus bit size bs2 is two times the first data bus bit size bs1, then the channelizer will channelize the incoming data into two data segments each of the first data bus bit size bs1. As another example, if the second data bus bit size bs2 is four times the first data bus bit size bs1, then the channelizer will channelize the incoming data into four data segments each of the first data bus bit size bs1, and so on.

During a store operation, the data transfer controller 309 transmits the data segments of the first data bus bit size bs1 through respective data channels 335A, 335B to respective channel controller modules 315A, 315B, in accordance with the first data bus bit size bs1 and in accordance with the first clock frequency clk1. In the example of FIG. 3, the second data bus bit size bs2 is two times the first data bus bit size bs1.

Therefore, the data transfer controller 309 channelizes the data into two data segments of the first data bus bit size bs1. A first of these data segments is transmitted from the data transfer controller 309 to a first channel controller module 315A, in accordance with the first data bus bit size bs1 and in accordance with the first clock frequency clk1, as indicated by arrows 335A and 333A. A second of these data segments is transmitted from the data transfer controller 309 to a second channel controller module 315B, in accordance with the first data bus bit size bs1 and in accordance with the first clock frequency clk1, as indicated by arrows 335B and 333B. It should be understood that the number of data channels used by the data transfer controller 309 is equal to the integer multiple by which the second data bus bit size bs2 is larger than the first data bus bit bus size bs1.

Each of the channel controller modules 315A and 315B is defined in an identical manner. However, each of the channel controller modules 315A and 315B is connected to access a different portion of the plurality of memory banks 109A-109D. In one embodiment, access to the plurality of memory banks 109A-109D is divided evenly among the number of channel controller modules 315A, 315B. For instance, in the example of FIG. 3, because there are two channel controller modules 315A, 315B, each channel controller module 315A, 315B is connected to access a different half of the plurality of memory banks 109A-109D. In other embodiments, it is possible that one or more channel controller modules, e.g., 315A, 315B, could access more or less of the memory banks, e.g., 109A-109D, relative to other channel controller modules. However, it should be understood, that each of the plurality of memory banks 109A-109D is accessible by one of the data channels, i.e., by one of the channel controller modules 315A, 315B. This avoids contention among the multiple channel controller modules 315A, 315B for access to the same memory bank 109A-109D at the same time. Thus, at most, each of the arbitration modules 107A-107D will handle potential contention between the first memory accessor 101 and one of the multiple channel controller modules 315A, 315B for access to the same memory bank 109A-109D at the same time.

Each channel controller module 315A, 315B includes a channel decoder 317A, 317B, respectively, defined to determine a memory address to which a memory access request is directed. The channel decoder 317A, 317B is further defined to direct the memory access request to one of the plurality of arbitration modules 107A-107D connected to one of the plurality of memory banks 109A-109D that includes the determined memory address, as indicated by arrows 117A1, 117A2, 117B1, 117B2.

In the example of FIG. 3, if the memory access request is directed to a memory address in the first memory bank 109A, the channel decoder 317A in the first channel controller module 315A will direct the memory access request to the first arbitration module 107A, as indicated by arrow 117A1. If the memory access request is directed to a memory address in the second memory bank 109B, the channel decoder 317A in the first channel controller module 315A will direct the memory access request to the second arbitration module 107B, as indicated by arrow 117A2. If the memory access request is directed to a memory address in the third memory bank 109C, the channel decoder 317B in the second channel controller module 315E will direct the memory access request to the third arbitration module 107C, as indicated by arrow 117B1. And, if the memory access request is directed to a memory address in the fourth memory bank 109D, the channel decoder 317B in the second channel controller module 315B will direct the memory access request to the fourth arbitration module 107D, as indicated by arrow 117B2.

It should be understood that data communication between the channel decoders 317A, 317B and the arbitration modules 107A-107D to which they are connected is conducted in accordance with the first data bus bit size bs1 and in accordance with the first clock frequency clk1. Therefore, it should be appreciated that the channelizer module 105 operates as a data bus size and clock frequency adapter to allow a memory system operating at a given data bus size and at a given clock frequency to be accessible by computing devices operating at a different data bus size and a different clock frequency. Each arbitration module 107A-107D is defined to control access to its connected memory bank 109A-109D so as to avoid memory access collisions. In one embodiment, each memory bank 109A-109D is defined to handle one access operation at a time. In this embodiment, each arbitration module 107A-107D will operate to ensure that its connected memory bank 109A-109D is accessed by only one computing resource at a time, whether the accessing resource is the first memory accessor 101 by way of the data bus 111, or the second memory accessor 103 by way of the channelizer module 105.

The foregoing description has addressed the memory access control module 203 for performing a data store, i.e., write, operation. During a load operation, i.e., read operation, the memory access control module 203 operates to receive the incoming memory access request from either the first memory accessor 101 or the second memory accessor 103, determine the memory address of the targeted data to be loaded, and retrieve and return the requested data. Specifically, if the first memory accessor 101 submits a data load request to the memory access control module 203, the decoder 301 determines the address where the data is to be loaded from and transmits the data load request to the arbitration module 107A-107D responsible for the corresponding memory bank 109A-109D. The arbitration module 107A-107D then directs its memory bank 109A-109D to return the requested data, which is then transmitted back to the first memory accessor 101.

On the channelizer module 105 side of the memory access control module 203, during a load operation, the appropriate arbitration module 107A-107D will direct its memory bank 109A-109D to return the requested data. The requested data is then transmitted to a data buffer 319A, 319B, by way of a load MUX 321A, 321B, within the channel controller module 315A, 315B responsible for the data channel to which the targeted arbitration module 107A-107D and memory bank 109A-109D are associated, as indicated by arrows 329A, 329B. From the data buffer 319A, 319B, the requested data is transmitted to the data transfer controller 309, as indicated by arrows 331A/335A, 331B/335B.

It should be understood that data loaded from the memory banks 109A-109D is transmitted from the memory banks 109A-109D to the data transfer controller 309 in accordance with the first data bus bit size bs1 and in accordance with the first clock frequency clk1. The data transfer controller 309 is defined to combine the data loaded from the memory banks 109A-109D into the second data bus bit size bs2 and transmit this combined data up to the second data interface 106 in accordance with the second clock frequency clk2. As shown in the example of FIG. 3, the combined data is transmitted from the data transfer controller 309 to the first load/store MUX 311, as indicated by arrow 351. From the first load/store MUX 311, the combined data is transmitted through the data FIFO 307 to the second load/store DEMUX 313, as indicated by arrows 343 and 345. Then, from the second load/store DEMUX 313, the combined data is transmitted to the bus controller 303, in accordance with the second data bus bit size bs2 and in accordance with the second clock frequency clk2, as indicated by arrow 347. The bus controller 303 then transmits the combined data to the second memory accessor 103 by way of the second data interface 106, in accordance with the second data bus bit size bs2 and in accordance with the second clock frequency clk2.

In one embodiment, such as that shown in FIG. 3, a number of the plurality of arbitration modules 107A-107D is four, a number of the plurality of memory banks 109A-109D is four, a number of the data channels is two, i.e., a number of the channel controller modules 315A, 315B is two, the second data bus bit size bs2 is two times the first data bus bit size bs1, and the first clock frequency clk1 is two times the second clock frequency clk2. In one instance of this embodiment, the second data bus bit size bs2 is 64 bits, and the first data bus bit size bs1 is 32 bits. It should be appreciated, however, that other embodiments of the memory access control module 203 can include essentially any number of arbitration modules and memory banks, and can include any number of channel controller modules corresponding to the integer multiple between the first and second data bus bit sizes.

Figure 4A:
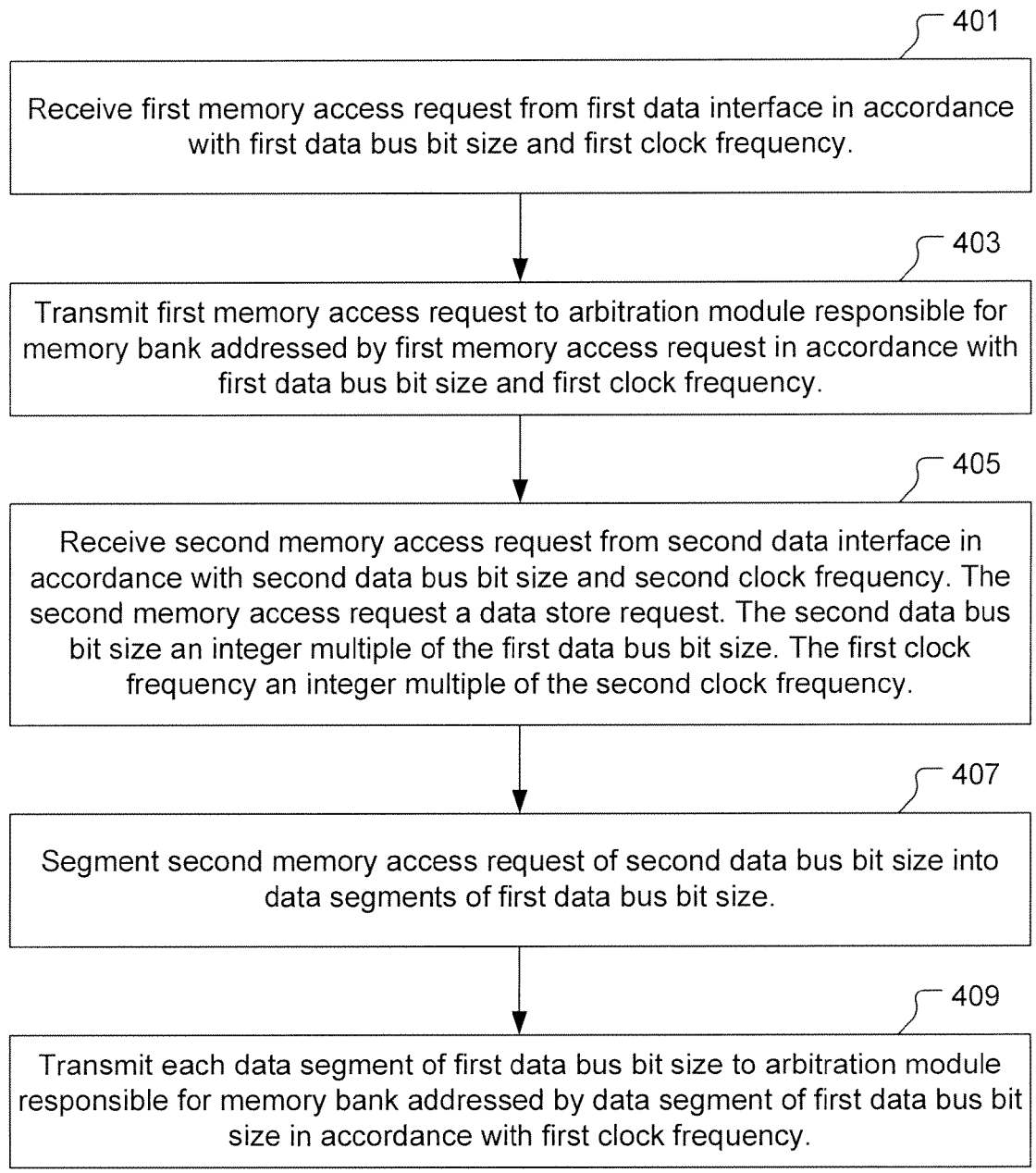
FIG. 4A shows a flowchart of a method for operating the memory access control module during a store operation to control access to a memory, in accordance with one embodiment of the present invention.

FIG. 4A shows a flowchart of a method for operating the memory access control module 203 during a store operation to control access to a memory, in accordance with one embodiment of the present invention. The method includes an operation 401 for receiving a first memory access request from a first data interface (104) in accordance with a first data bus bit size (bs1) and a first clock frequency (clk1). The method also includes an operation 403 for transmitting the first memory access request to an arbitration module (107A-107D) responsible for a memory bank (109A-109D) addressed by the first memory access request in accordance with the first data bus bit size (bs1) and the first clock frequency (clk1). The method also includes an operation 405 for receiving a second memory access request from a second data interface (106) in accordance with a second data bus bit size (bs2) and a second clock frequency (clk2). The second memory access request is a data store request. The second data bus bit size (bs2) is an integer multiple of the first data bus bit size (bs1). The first clock frequency (clk1) is an integer multiple of the second clock frequency (clk2).

The method further includes an operation 407 for segmenting the second memory access request of the second data bus bit size (bs2) into data segments of the first data bus bit size (bs1). The method also includes an operation 409 for transmitting each data segment of the first data bus bit size (bs1) to an arbitration module (107A-107D) responsible for a memory bank (109A-109D) addressed by the data segment of the first data bus bit size (bs1) in accordance with the first clock frequency (clk1). Each data segment of the first data bus bit size (bs1)) is transmitted through a separate data channel to the arbitration module (107A-107D) responsible for its addressed memory bank (109A-109D). Also, each data channel communicates with a separate group of memory banks (109A-109D).

In one example embodiment, the first data interface (104) is connected to a computer processor, and the second data interface (106) is connected to a system bus master. Also, in one example embodiment, the second data bus bit size (bs2) is two times the first data bus bit size (bs1). In one instance of this example embodiment, the first data bus bit size is 32 bits, and the second data bus bit size is 64 bits. Also, in one example embodiment, the first clock frequency (clk1) is two times the second clock frequency (clk2). In one example embodiment, the memory includes four arbitration modules (107A-107D) and four memory banks (109A-109D), and a number of the data channels is two, and the second data bus bit size (bs2) is two times the first data bus bit size (bs1), and the first clock frequency (clk1) is two times the second clock frequency (clk2). Additionally, in one example embodiment, the method includes operating the arbitration modules (107A-107D) to give a higher access priority to the first memory access request from the first memory accessor (101) relative to the data segments of the second memory access request from the second memory accessor (103).

Figure 4B:
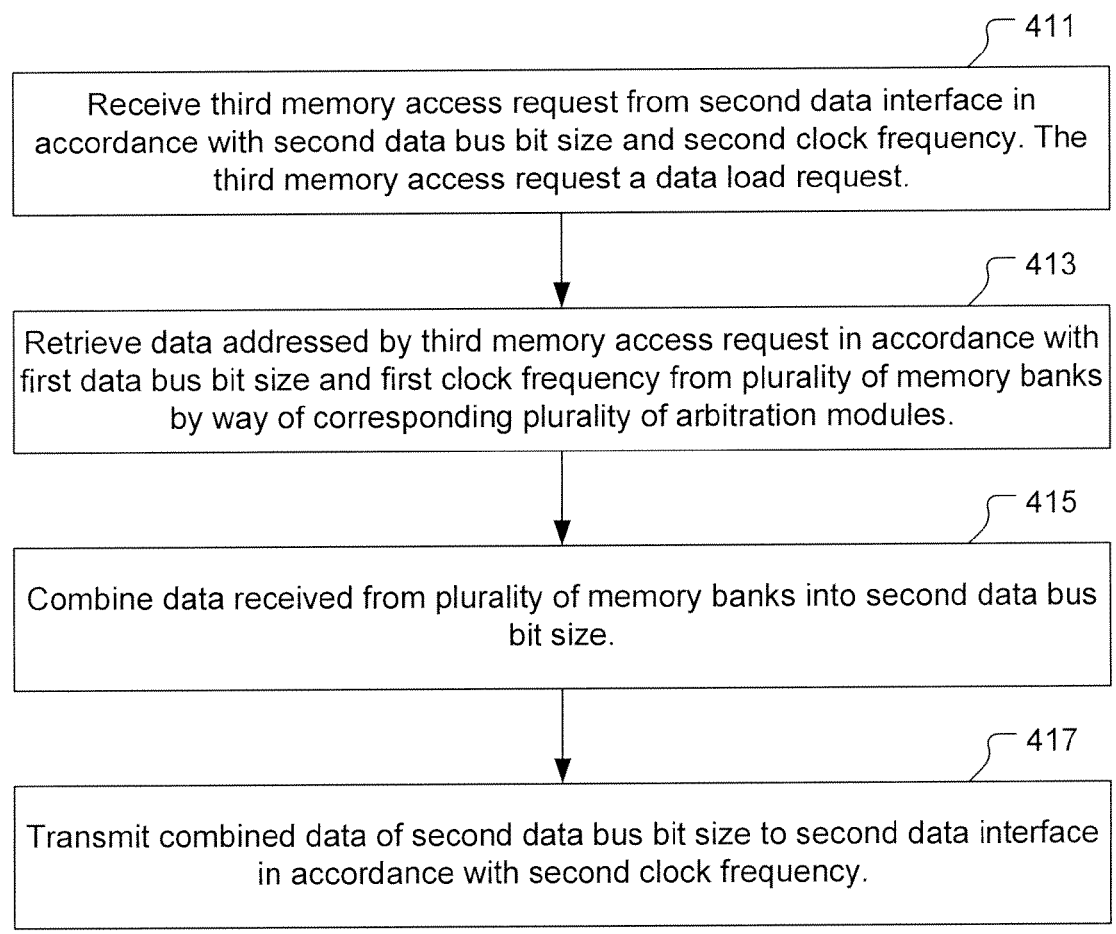
FIG. 4B shows a flowchart continuing the method of FIG. 4A for operating the memory access control module during a load operation, in accordance with one embodiment of the present invention.

FIG. 4B shows a flowchart continuing the method of FIG. 4A for operating the memory access control module 203 during a load operation, in accordance with one embodiment of the present invention. The method includes an operation 411 for receiving a third memory access request from the second data interface (106) in accordance with the second data bus bit size (bs2) and the second clock frequency (clk2). The third memory access request is a data load request, i.e., data read request. The method also includes an operation 413 for retrieving data addressed by the third memory access request in accordance with the first data bus bit size (bs1) and first clock frequency (clk1) from a plurality of memory banks (109A-109D) by way of a corresponding plurality of arbitration modules (107A-107D). The method also includes an operation 415 for combining the data received from the plurality of memory banks (109A-109D) into the second data bus bit size (bs2). The method also includes an operation 417 for transmitting the combined data of the second data bus bit size (bs2) to the second data interface (106) in accordance with the second clock frequency (clk2).

Based on the foregoing, it should be appreciated that the memory access control module 203 disclosed herein provides a system and method to enable access to direct close-coupled memory by external direct memory access (DMA) engines without interfering with processor memory access operations. In following, the memory access control module 203 disclosed herein provides for easier circuit timing closure and higher performance memory access. Also, the memory access control module 203 is firmware transparent, i.e., firmware friendly.

In view of the foregoing, it should be understood that the memory access control module 203 can function to interleave data storage among the plurality of memory banks 109A-109D. For example, in one embodiment, the memory banks 109A and 109C can cover a lower half of an addressable memory range, and memory banks 109B and 109D can cover an upper half of the addressable memory range. Each data communication of the second data bus bit size bs2 is separated into two data segments of the first data bus bit size bs1. Then, the first data segment of the first data bus bit size bs1 is transmitted through the first channel control module 315A to either the first memory bank 109A or the third memory bank 109C. And, the second data segment of the first data bus bit size bs1 is transmitted through the second channel control module 315B to either the second memory bank 109B or the fourth memory bank 109D. In this manner, the data coming in through the second data interface 106 is interleaved between the first half of the memory banks 109A, 109C, and the second half of the memory banks 109B, 109D. Also, in this manner, one bs2 access (either lower or upper half) from Accessor 2 103 may be done in parallel.

The memory access control module 203 also provides a read prefetch and write buffer capability. More specifically, because the first clock frequency clk1 is an integer multiple, e.g., twice, the second clock frequency clk2, there is the integer multiple of attempts available to prefetch read data in accordance with the first clock frequency clk1 for each cycle of the second clock frequency clk2. Also, because of the multiple data channels provided by the data transfer controller 309 and multiple channel controller modules 315A, 315B, it is possible to prefetch a portion of the read request through each data channel independently.

It should be understood that the memory access control module 203 provides for simultaneous access by multiple memory accessors, e.g., 101, 103, to different parts of the shared memory, i.e., to different memory banks 109A-109D. Thus, the memory access control module 203 is defined to manage: 1) simultaneous request to a shared memory by multiple computing resources, 2) clock synchronization issues between the shared memory and multiple computing resources accessing the shared memory, 3) data bus bit size differences between the shared memory and multiple computing resources accessing the shared memory, and 4) simultaneous access by multiple computing resources to different parts of the shared memory.

The invention described herein can be embodied as computer readable code on a computer readable medium. For example, the computer readable code can include a layout data file within which one or more layouts corresponding to memory access control module 203 are stored. The computer readable medium mentioned herein is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

It should be further understood that the memory access control module 203 as disclosed herein can be manufactured as part of a semiconductor device or chip. In the fabrication of semiconductor devices such as integrated circuits, memory cells, and the like, a series of manufacturing operations are performed to define features on a semiconductor wafer. The wafer includes integrated circuit devices in the form of multi-level structures defined on a silicon substrate. At a substrate level, transistor devices with diffusion regions are formed. In subsequent levels, interconnect metallization lines are patterned and electrically connected to the transistor devices to define a desired integrated circuit device. Also, patterned conductive layers are insulated from other conductive layers by dielectric materials.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A memory access control module, comprising:
   a first data interface for data transfer to and from a first data communication bus in accordance with a first data bus bit size and a first clock frequency;
   a plurality of arbitration modules connected for data communication with the first data interface in accordance with the first data bus bit size and the first clock frequency;
   a plurality of memory banks connected for data communication with the plurality of arbitration modules in accordance with the first data bus bit size and the first clock frequency, such that each of the plurality of memory banks is connected for data communication with a different one of the plurality of arbitration modules;
   a second data interface for data transfer to and from a second data communication bus in accordance with a second data bus bit size and a second clock frequency, the second data bus bit size an integer multiple of the first data bus bit size, the first clock frequency an integer multiple of the second clock frequency;
   a channelizer module connected for data communication with the second data interface in accordance with the second data bus bit size and the second clock frequency, the channelizer module further connected for data communication with the plurality of arbitration modules in accordance with the first data bus bit size and first clock frequency, the channelizer module defined to—
   a) segment data received from the second data interface during a store operation from the second data bus bit size into a number of data segments of the first data bus bit size,
   b) transmit the data segments of the first data bus bit size along respective data channels to addressed ones of the plurality of memory banks by way of corresponding ones of the plurality of arbitration modules in accordance with the first clock frequency during the store operation,
   c) receive data in accordance with the first data bus bit size and first clock frequency from addressed ones of the plurality of memory banks by way of corresponding ones of the plurality of arbitration modules during a load operation, and
   d) combine data received from the plurality of memory banks during the load operation into the second data bus bit size and transmit the combined data of the second data bus bit size to the second data interface in accordance with the second clock frequency.

2. The memory access control module of claim 1, wherein the first data communication bus is connected for data communication with a computer processor, and the second data communication bus is connected for data communication with a system bus master.

3. The memory access control module of claim 1, wherein the first data bus bit size is 32 bits, and the second data bus bit size is 64 bits.

4. The memory access control module of claim 1, wherein the second data bus bit size is two times the first data bus bit size.

5. The memory access control module of claim 4, wherein the first clock frequency is two times the second clock frequency.

6. The memory access control module of claim 1, further comprising:
a first decoder connected between the first data interface and the plurality of arbitration modules, the first decoder defined to determine a memory address to which a memory access request is directed, the first decoder defined to direct the memory access request to one of the plurality of arbitration modules connected to one of the plurality of memory banks that includes the determined memory address.

7. The memory access control module of claim 1, wherein the number of data segments of the first data bus bit size is equal to the integer multiple by which the second data bus bit size is larger than the first data bus bit size, and the number of data channels is equal to the integer multiple by which the second data bus bit size is larger than the first data bus bit size.

8. The memory access control module of claim 7, wherein each data channel is connected to access a portion of the plurality of memory banks, such that each of the plurality of memory banks is accessible by one of the data channels.

9. The memory access control module of claim 8, wherein each data channel includes a channel decoder defined to determine a memory address to which a memory access request is directed, the channel decoder defined to direct the memory access request to one of the plurality of arbitration modules connected to one of the plurality of memory banks that includes the determined memory address.

10. The memory access control module of claim 1, wherein a number of the plurality of arbitration modules is four, a number of the plurality of memory banks is four, a number of the data channels is two, the second data bus bit size is two times the first data bus bit size, and the first clock frequency is two times the second clock frequency.

11. A method for controlling access to a memory, comprising:
receiving a first memory access request from a first data interface in accordance with a first data bus bit size and a first clock frequency;
transmitting the first memory access request to an arbitration module responsible for a memory bank addressed by the first memory access request in accordance with the first data bus bit size and the first clock frequency;
receiving a second memory access request from a second data interface in accordance with a second data bus bit size and a second clock frequency, wherein the second memory access request is a data store request, the second data bus bit size an integer multiple of the first data bus bit size, the first clock frequency an integer multiple of the second clock frequency;
segmenting the second memory access request of the second data bus bit size into data segments of the first data bus bit size; and
transmitting each data segment of the first data bus bit size to an arbitration module responsible for a memory bank addressed by the data segment of the first data bus bit size in accordance with the first clock frequency.

12. A method for controlling access to a memory as recited in claim 11, further comprising:
operating each arbitration module to give a higher access priority to the first memory access request relative to the data segments of the second memory access request.

13. A method for controlling access to a memory as recited in claim 11, further comprising:
receiving a third memory access request from the second data interface in accordance with the second data bus bit size and the second clock frequency, wherein the third memory access request is a data load request;
retrieving data addressed by the third memory access request in accordance with the first data bus bit size and first clock frequency from a plurality of memory banks by way of a corresponding plurality of arbitration modules;
combining the data received from the plurality of memory banks into the second data bus bit size; and
transmitting the combined data of the second data bus bit size to the second data interface in accordance with the second clock frequency.

14. A method for controlling access to a memory as recited in claim 11, wherein the first data interface is connected to a computer processor, and the second data interface is connected to a system bus master.

15. A method for controlling access to a memory as recited in claim 11, wherein the first data bus bit size is 32 bits, and the second data bus bit size is 64 bits.

16. A method for controlling access to a memory as recited in claim 11, wherein the second data bus bit size is two times the first data bus bit size.

17. A method for controlling access to a memory as recited in claim 11, wherein the first clock frequency is two times the second clock frequency.

18. A method for controlling access to a memory as recited in claim 11, wherein each data segment of the first data bus bit size is transmitted through a separate data channel to the arbitration module responsible for its addressed memory bank.

19. A method for controlling access to a memory as recited in claim 18, wherein each data channel communicates with a separate group of memory banks.

20. A method for controlling access to a memory as recited in claim 18, wherein the memory includes four arbitration modules and four memory banks, and wherein a number of the data channels is two, and wherein the second data bus bit size is two times the first data bus bit size, and wherein the first clock frequency is two times the second clock frequency.

* * * * *